United States Patent
Freeman, III

(10) Patent No.: US 10,480,663 B2
(45) Date of Patent: Nov. 19, 2019

(54) CONTINUOUSLY CONCENTRIC VALVE WITH MOVABLE FLOW GUIDES

(71) Applicant: TRUE BLUE MOTORSPORT, Englewood, NJ (US)

(72) Inventor: Jesse L. Freeman, III, Warminster, PA (US)

(*) Notice: Subject to any disclaimer, the term of this patent is extended or adjusted under 35 U.S.C. 154(b) by 0 days.

(21) Appl. No.: 15/744,648

(22) PCT Filed: Jul. 13, 2016

(86) PCT No.: PCT/US2016/042127
§ 371 (c)(1),
(2) Date: Jan. 12, 2018

(87) PCT Pub. No.: WO2017/011575
PCT Pub. Date: Jan. 19, 2017

(65) Prior Publication Data
US 2018/0202559 A1    Jul. 19, 2018

Related U.S. Application Data

(60) Provisional application No. 62/191,910, filed on Jul. 13, 2015.

(51) Int. Cl.
| | |
|---|---|
| *F16K 3/03* | (2006.01) |
| *F16K 31/528* | (2006.01) |
| *F15D 1/02* | (2006.01) |
| *F15D 1/00* | (2006.01) |
| *F02M 29/06* | (2006.01) |
| *F02M 35/10* | (2006.01) |
| *F02D 9/14* | (2006.01) |
| *F02D 9/02* | (2006.01) |
| *F02M 19/08* | (2006.01) |

(52) U.S. Cl.
CPC .............. *F16K 3/03* (2013.01); *F02D 9/02* (2013.01); *F02D 9/14* (2013.01); *F02M 19/08* (2013.01); *F02M 29/06* (2013.01); *F02M 35/10262* (2013.01); *F15D 1/001* (2013.01); *F15D 1/025* (2013.01); *F16K 31/528* (2013.01); *Y02T 10/146* (2013.01)

(58) Field of Classification Search
CPC .......... F16K 3/03; F16K 31/528; F15D 1/001; F15D 1/025; F02M 29/06; F02M 35/10262; F02M 19/08; F02D 9/02; F02D 9/14; Y02T 10/146
See application file for complete search history.

(56) References Cited

U.S. PATENT DOCUMENTS 3,159,179 A * 12/1964 De Lain Robert L ....................... B04C 11/00
137/545
4,094,492 A * 6/1978 Beeman .................... F16K 3/03
138/45

(Continued)

*Primary Examiner* — Marina A Tietjen
(74) *Attorney, Agent, or Firm* — Ellenoff Grossman & Schole LLP; James M. Smedley, Esq.

(57) ABSTRACT

The present invention relates to a valve for controlling the volume and flow characteristics of a fluid in a predictable controllable manner. Specifically, the invention relates to an air valve design for an internal combustion engine throttle body that proportionately manages air flow, pressure, and velocities through all stages of opening with consistent and measurable parameters through a concentric or near-concentric opening.

9 Claims, 6 Drawing Sheets

(56) References Cited

U.S. PATENT DOCUMENTS

| | | | | |
|---|---|---|---|---|
| 5,542,863 | A | * | 8/1996 | Brian .................... B63H 11/103 239/546 |
| 2006/0261303 | A1 | * | 11/2006 | Thomas .................... F02D 9/14 251/212 |
| 2008/0022652 | A1 | * | 1/2008 | Blacklidge ................ F04B 7/04 60/221 |
| 2009/0302252 | A1 | * | 12/2009 | Cheung .................... F02D 9/14 251/212 |

* cited by examiner

CONTINUOUSLY CONCENTRIC VALVE WITH MOVABLE FLOW GUIDES

CROSS-REFERENCE TO RELATED APPLICATIONS

This application is a national stage of International Application No. PCT/US2016/042127, filed on Jul. 13, 2016, and published in English on Jan. 19, 2017 as WO 2017/011575, which claims priority to U.S. Provisional Patent Application No. 62/191,910 filed Jul. 13, 2015, the contents of each of which are hereby incorporated by reference in their entirety.

FIELD OF THE INVENTION

The present invention relates to a valve for controlling the volume and flow characteristics of a fluid in a predictable controllable manner. Specifically, the invention relates to an air valve design for an internal combustion engine throttle body that proportionately manages air flow, pressure, and velocities through all stages of opening with consistent and measurable parameters through a concentric or near-concentric opening.

BACKGROUND OF THE INVENTION

There are various and different valve designs that have been, and currently are, used to control the flow of fluids. Air is considered a fluid for the purposes of fluid dynamics. Some of these valves are used in internal combustion engines.

A poppet valve, also called a mushroom valve, is a simple legacy design from the steam power era when the primary design criteria was to either hold or immediately evacuate mass pressure. A poppet valve consists of a hole and a tapered plug at the end of a rod or shaft called a valve stem. The valve stem is often spring loaded to keep the valve closed unless a force is applied to the end of the valve stem that is sufficient to overcome the spring force. When the plug is forced away from the hole, pressure passes rapidly from one side of the valve to the other. The poppet valve was designed and intended for use where there is no concern for consequential flow pattern, pressure, etc, and is commonly used on the intake and exhaust ports of internal combustion engines. The ideal application for a poppet valve is in systems where the most frequent conditions require the valve to stay closed.

A barrel valve has a rotating section that aligns flush with the wall of the pipe when the valve is fully open, eliminating any obstructions to flow. When rotated 90 degrees, the section is perpendicular to the pipe and completely blocks flow. Every position between fully open and fully closed presents some degree of obstruction on one side of the pipe (asymmetric) and disrupts smooth flow through the valve. A double barrel valve, where two barrel valves operating in opposite directions close toward the center of the flow chamber, somewhat alleviates this asymmetric obstruction problem, but doubles the complexity of the valve system creates a need to synchronize the two barrel valves with each other. Barrel valves are best suited for situations where the most frequent conditions require fully open unobstructed flow.

Butterfly valves function by means of a plate that rotates 90 degrees between fully closed and fully opened. When fully closed, the plate sits perpendicular to the pipe and blocks flow. When fully open, the plate sits parallel to the pipe and the fluid flows around the plate. Butterfly valves are popular because they offer a small usable range of control between open and closed where the rate of flow can be adjusted. In an automobile, this type of valve is often used on the air intake for throttling. One disadvantage of the butterfly valve is that even in the fully open position, the fluid must flow around the side profile of the plate, so there is always at least a small interruption to the flow, and a resulting pressure differential that substantially increases with heat soak. Another disadvantage of the butterfly valve is the limited range within which flow and pressure can be controlled. Flow and pressure between zero and 20 degrees open is erratic and unpredictable, and changes very little between 70 and 90 degrees open. This leaves a limited range of usable near-linear control between 20 and 70 degrees open.

The Butterfly valve is popular for its economic and simple design and is often designed to fit a given flow size without considering performance limitations. In conditions where frequent pressure drops and increases occur, the butterfly valve performs poorly outside of very narrow control ranges. The central location and counter directional movement of the disc itself creates a non-linear pressure differential between the separated chambers during the disc's overall transition. One can only precisely measure flow, pressure, velocity, etc., and time subsequent-dependent activities so long as the valve is in a fixed position or the measured range of motion is near the fully opened position. The closer that the valve's transitional movements are to the fully closed position, the more difficult it is to precisely measure resulting flows, pressures, velocities, etc. If a butterfly valve frequently and quickly moves throughout its entire range of motion, as is the case in a throttle application, calculations and subsequent timed events become impossible to measure and control with a useful degree of accuracy. This is due to a process gain that is very high at low travels and very low at higher travels. Butterfly valves do not perform very well outside a control range from about 30 percent to 50 percent open. They tend to be difficult to control at low travels, below 30 percent, because of high gain in this region and sluggish above 50 percent because of low gain. This valve may be sized to handle a specific flow within its control range, but if process conditions change, that valve may be asked to perform beyond its control range, resulting in a loss of stability and growing inefficiency. This is why the butterfly valve requires expensive, high resolution motor drive systems and electronic management controls in order to maximize operation in its efficiency range.

None of the valve designs (poppet, barrel, or butterfly) described above are intended for, or ideal for use in, conditions where frequent transitional and full range valve motion occurs with changing air velocity, pressure, and direction. There are drawbacks, even for the butterfly valve, when used in an internal combustion engine throttle body.

Current designs of baffles for inducing rotational motion in the fluid or air flow consist of static design features along the inner wall at fixed locations along the flow path. These static features are not capable of adjustment for different flow rates, or different valve positions. Therefore, an ideal rotational motion for a particular flow rate must be determined and fixed at design time. No prior art baffle designs were intended for, or are ideal for use in, conditions where frequent transitional and full range valve motion occurs, producing changing air velocity, pressure, and direction.

Therefore there is a need in the art for a valve capable of predictably controlling flow rate at all valve positions between fully closed and fully open. A system is needed for utilizing flow rate and direction control components to facilitate centralized airflow direction, expansion, and compression that are generally consistent with demands of the flow control system during all operations and positions of the valve, from fully opened to fully closed. Ideally, the valve opening should hold consistent in shape throughout the operating range while changing primarily in size and remaining centered within the pipe or housing. These features help to accomplish predictable flow characteristics throughout the operating range of the valve. These and other features and advantages of the present invention will be explained and will become obvious to one skilled in the art through the summary of the invention that follows.

SUMMARY OF THE INVENTION

Accordingly, it is an object of the present invention to provide an air valve with accurate and predictable pressure and flow control characteristics over the full range of operation. Another object of the present invention is control airflow at various valve openings to optimize flow through the opening within the full operating range.

According to an embodiment of the present invention, a flow-guiding concentric valve comprises: a housing with one or more pass-through holes that pass from an exit end into the interior of the housing; and a venturi cone at the housing entrance which fits flush within the inside of the housing adjacent to the pass-through holes, wherein the venturi cone is cut into two or more sectors, each of which forms a flow guide. According to another embodiment of the present invention, the previously disclosed flow-guiding concentric valve further comprises an iris mechanism on the front or exit end of the housing, said iris mechanism comprising: a plurality of arced plates, and a cam ring with a plurality of stud slots, wherein each arced plate has a rotating stud on a bottom surface that passes into one of the pass-through holes in the housing and a sliding stud on a top surface that protrudes into one of the stud slots; wherein one or more of the rotating studs extends and connects to one or more of the corresponding flow guides such that, when the iris mechanism is closed, the rotating studs transfer the movement of the arced plates to the flow guides, increasingly turning the flow guides toward the center of the iris mechanism as the iris mechanism closes. According to another embodiment of the invention, the valve may further comprise a base ring. In yet another embodiment, the arced plates are made of a thin resilient material such as metal, plastic, fiberglass, synthetic fiber, para-aramid synthetic fiber, carbon fiber, cellulose nanocrystals, resin or any combination of these materials. In another embodiment of the invention, the arced plates are shaped in a semicircle. In another embodiment of the invention, the base ring is a flat annular plate with a number of pivot holes that pass through it. In another embodiment of the invention, the arced plates are oriented about an inner circumference of the housing in a concentric fashion. In another embodiment of the invention, the base ring abuts the housing of the flow-guiding portion, wherein the thickness of the housing is proportionately equal to the width of the base ring, which is proportionately equal the width of the cam ring, and an inner radius of the housing is proportionately equal to an inside radius of both the base ring and the cam ring. In another embodiment of the invention, the valve opening is defined by inner radii of the cam ring and base ring when fully open. In another embodiment of the invention, the rotating studs are rigidly connected to the flow guides so that they do not rotate relative to each other. In another embodiment of the invention, an iris mechanism on the front or exit end of a housing comprises a plurality of arced plates, and a cam ring with a plurality of stud slots, wherein each arced plate has a rotating stud on a bottom surface that passes into one of a plurality of pass-through holes in the housing and a sliding stud on a top surface that protrudes into one of the stud slots; wherein one or more of the rotating studs extends and connects to one or more corresponding flow guides such that, when the iris mechanism is closed, the rotating studs transfer the movement of the arced plates to the flow guides, increasingly turning the flow guides toward the center of the iris mechanism as the iris mechanism closes.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention relates to a valve for controlling the volume and flow characteristics of a fluid in a predictable and controllable manner. Specifically, the invention relates to an air valve design for an internal combustion engine throttle body that proportionately manages air flow, pressure, and velocities through all stages of opening with consistent and measurable parameters through a concentric or near-concentric opening.

Although the present invention may be used in any situation that requires the variable control of flow rate and flow pattern of a fluid, throughout the specification, for the purpose of simplicity, the flow-guiding concentric valve will be described as part of the throttle body on an Internal Combustion Engine.

Figure 1A:
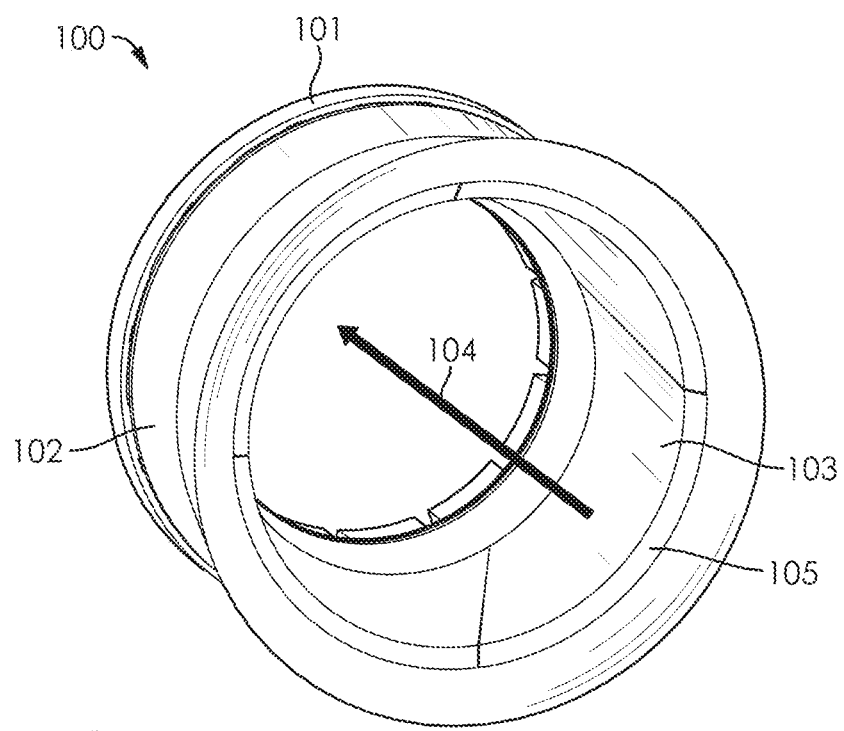
FIG. 1A is a perspective view of the flow-guiding concentric valve from the side of the rotating flow guides, which are lying flush against the inside of the housing according to an embodiment of the present invention in an open position.

According to an embodiment of the present invention, as shown in FIG. 1A, the flow-guiding concentric valve 100 has two primary portions: the concentric valve 101 portion, and the flow-guiding portion 102, which comprises flow-guides 103 or baffles. The direction of flow is indicated by a flow arrow 104 in the figures. In this view, the concentric valve 101 is fully open and the flow guides 103 are lying flush against the inner surface of the flow-guiding portion 102. When integrated into an Internal Combustion Engine (ICE) throttle body, the concentric valve 101 portion is placed downstream of the flow-guides 103 or baffles. This means that the typical flow path for air entering an engine would pass the air filter, flow-guides 103, and concentric valve 101, in that order, before reaching the combustion chamber. There may be, and usually are, other elements or components also in this flow path.

According to an embodiment of the present invention, the flow-guiding concentric valve allows air flow to be controlled from fully open to fully closed without presenting any asymmetric obstacles to the flow of air. The flow-guides 103 direct airflow into a vortex that facilitates smooth flow through the concentric valve 101 in all valve positions. The flow-guides 103 move in concert with the concentric valve 101 so that as the valve opening gets smaller, the flow-guides more aggressively direct air toward the center of the flow path, through the valve opening.

Figure 1B:
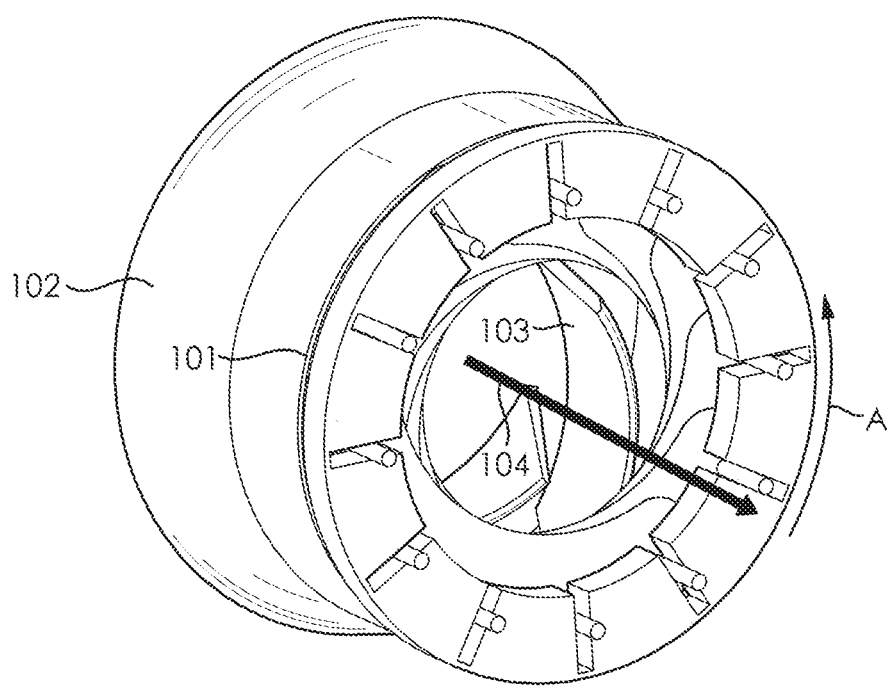
FIG. 1B is a perspective view of the flow-guiding concentric valve from the back side of the iris mechanism with the iris mechanism partially closed, causing the baffles to be slightly turned inward to produce a vortex as air flows over the baffles according to an embodiment of the present invention.

FIG. 1B shows the flow-guiding concentric valve 100 from the back side, the air exit side, or the side with the concentric valve. In this view, the concentric valve 101 is partially closed and the flow guides are slightly lifted up, directing the flow of air toward the center of the valve opening. Rotation of the cam ring in the A direction causes the valve to close and the flow guides to lift away from the housing and rotate toward the center of the valve opening. The function of the concentric valve 101 and its interaction with the flow guides 103 will now be explained in greater detail with reference to the remaining figures.

Figure 2A:
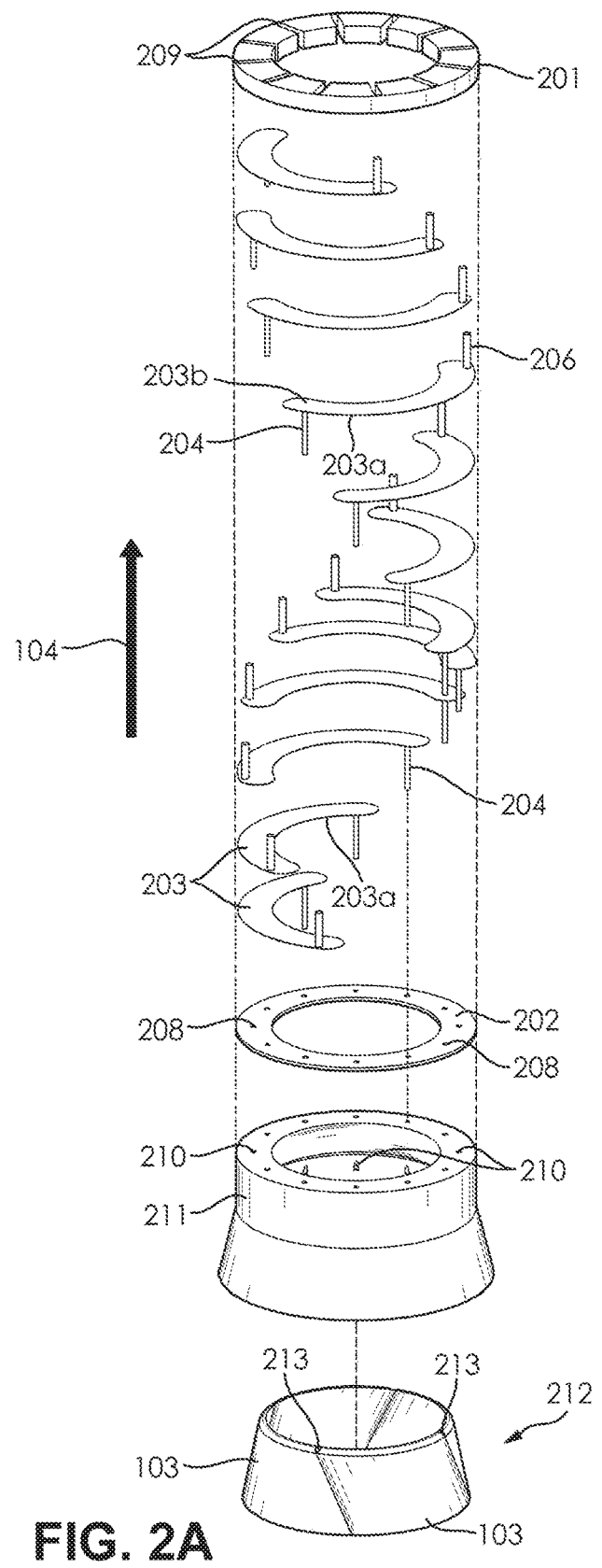
FIG. 2A is an exploded side view of the flow-guiding concentric valve assembly showing how the arced plates are arranged to form an iris mechanism according to an embodiment of the present invention.
Figure 2B:
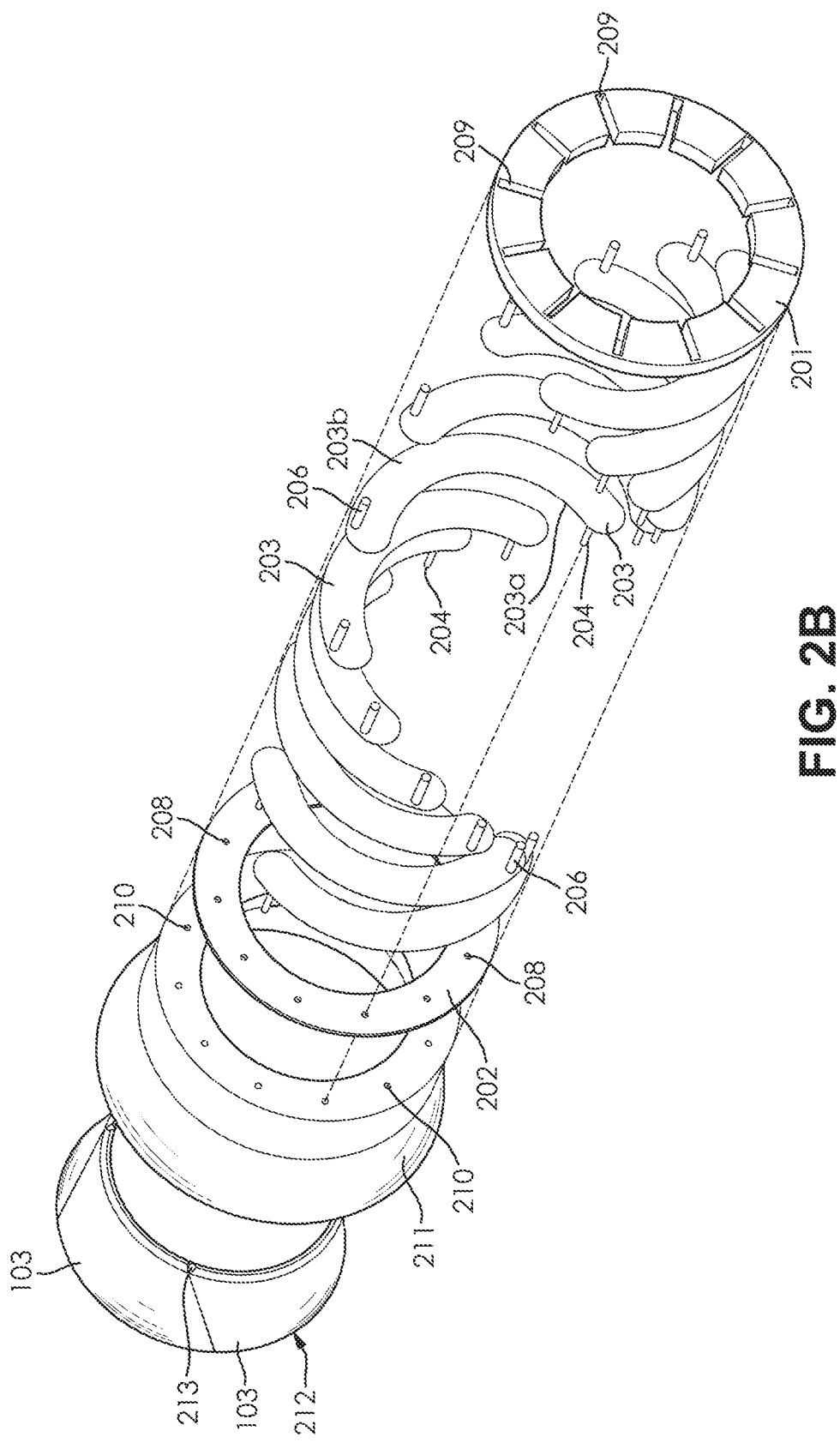
FIG. 2B is an exploded perspective view of the flow-guiding concentric valve assembly from the concentric valve side according to an embodiment of the present invention.

Referring now to FIGS. 2A and 2B, the concentric valve 101 may be constructed using an iris mechanism. According to an embodiment of the present invention, the iris mechanism is constructed from a cam ring 201, a base ring 202, and several arced plates 203 made of a thin resilient material such as metal, plastic, fiberglass, synthetic fiber, para-aramid synthetic fiber, carbon fiber, cellulose nanocrystals, resin or any combination of these materials. Each arced plate 203 is shaped in a semicircle with substantially the same width from end to end and a rotating stud 204 protruding from the front face 205 of the arced plate on the first end and a sliding stud 206 protruding from the back face 207 of the arced plate on the second end. If the arced plate is viewed along its edge with the direction of air flow up, the sliding stud 206 will point up and the rotating stud 204 will point down. The terms front, back, first, and second are arbitrarily chosen merely to distinguish one end of the metal plate from the other and one side of the metal plate from the other. The terms are not intended to denote any limitations beyond what is disclosed in this specification.

According to an embodiment of the present invention, the base ring 202 is a flat annular plate with a number of pivot holes 208 that pass through it. The pivot holes 208 are evenly spaced from each other and equal distance from the center of the base ring 202. The number of pivot holes is at least the same as the number of arced plates 203. The figures show twelve arced plates 203, but one of ordinary skill in the art would recognize that there may be more or fewer than twelve arced plates 203. The rotating stud 204 of each arced plate 203 passes through one of the pivot holes 208 in the base ring 202. The arced plates 203 are stacked on top of each other, partially overlapping, such that each arced plate overlaps the rotating stud portion of one of the plates next to it, as shown in FIG. 2. The first arced plate 203 is placed on the base ring 202 with the rotating stud 204 passing through one of the pivot holes 208 and the remainder of the arced plate 203 lying along the circumference of the base ring 202. The next arced plate 203 is placed on top of the first arced plate 203 with the rotating stud 204 inserted through the next exposed pivot hole 208. This process continues plate by plate around the circumference of the base ring 202.

Note that the first arced plate 203 will cover one or more pivot holes 208, other than the one it is using, in the base ring 202. The first plate, and any subsequent plates that are covering available pivot holes 208 can be rotated out of the way as necessary to allow all of the arced plates 203 to be placed with each rotating stud 204 inserted into a pivot hole 208. The cam ring 201 is then placed on top of the overlapping arced 203 plates with each arced plate's sliding stud 206 fitting into a stud slot 209 on the cam ring 201. The arced plates 203 are sandwiched between the base ring 202 and the cam ring 201 with the rotating studs 204 inserted into the pivot holes 208 on the base ring 202, and the sliding studs 206 inserted into the stud slots 209 of the cam ring 201.

Referring to FIG. 2A, according to an embodiment of the present invention, the rotating studs 204 are long enough to pass through the base ring 202 and into pass-through holes 210 in the housing 211 of the flow-guiding portion 102. Where the base ring 202 abuts the housing 211 of the flow-guiding portion, the thickness of the housing 211 is about equal to the width of the base ring 202 which is the same as the width of the cam ring 201, and the inner radius of the housing 211 is equal to the inside radius of both the base ring 202 and the cam ring 201. This consistent inner radius from the exit of the flow-guiding portion 102 through the concentric valve 101 (shown in FIGS. 1A-1B) allows for smooth unobstructed air flow through the valve. This provides a benefit over the prior art butterfly valve because the butterfly valve always presents an obstruction to air flow even when fully open. The inner radius of the housing 211 increases as you move from the concentric valve 101 toward the entrance opening of the flow-guiding portion 102 (also shown in the cross-section of FIG. 3). This increasing inner radius allows the pass-through holes 210 to pass through the body of the housing 211 into the inside of the flow-guiding portion 102. Thus, the pass-through holes 210 allow the mechanical rotation of the rotating studs 204 to be transferred inside the flow-guiding portion and used to manipulate the flow guides 103.

According to an embodiment of the present invention, when fully open, the valve opening is defined by the inner radii of the cam ring 201 and base ring 202. According to an embodiment of the present invention, the concentric valve 101 operates by rotating the cam ring 201 in direction A (shown in FIG. 1B), which moves the sliding stud 206 on each plate in an arc across one side of the valve opening, causing the arced plates 203 to pivot on the rotating stud 204 and swivel toward the center of the valve opening. As the cam ring 201 rotates, the overlapping arced plates 203 create a progressively smaller valve opening with the center in a fixed position throughout the range of motion. When the concentric valve 101 is fully open the arced plates 203 are recessed between the base ring 202 and the cam ring 201 and do not obstruct the opening defined by the inner radii of the cam ring 201 and base ring 202.

Figure 3:
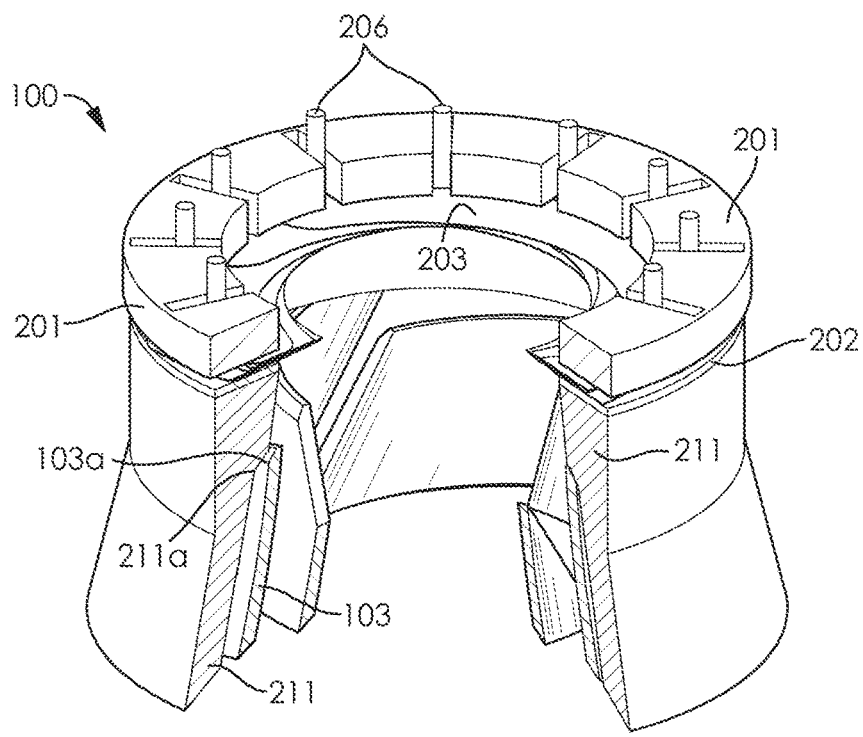
FIG. 3 is a cross-sectional perspective view of the flow-guiding concentric valve showing the sidewalls of the flow-guiding portion housing according to an embodiment of the present invention.

FIG. 3 shows a cross-section perspective view of the flow-guiding concentric valve 100. According to one embodiment of the present invention, the arced plates 203 are sandwiched between the cam ring 201 and the base ring 202. The base ring 202 abuts the end of the flow-guiding portion's housing 211, which ends at a thickness equal to the base ring 202 and tapers toward the entrance opening, increasing the inner diameter of the housing. The increasing inner diameter as the distance from the base ring 202 increases allows for the rotating studs 204 to pass through the pass-through holes in the housing 211 to reach the interior of the housing 211 to connect to the flow guides 103. As shown in FIG. 3, the outer surface 103a of the flow guides 103 and the inner surface 211A of the housing 211 are shaped corresponding to each other so that they fit flush together.

The space between the cam ring 201 and the base ring 202 creates a blade recess area. The clearance within this blade recess area is tight enough to produce a self-cleaning action on the arced plates 203 as they slide into the blade recess area and the surface of the arced plate 203 rubs against the inner edge of the cam ring 201 or base ring 202. The arced plates 203 are also stacked with tight enough clearance that the motion of the arced plates 203 as the concentric valve 101 opens and closes produces a self-cleaning action as the edge of each arced plate 203 runs over the surface of the adjacent arced plates 203.

According to one embodiment of the present invention, the housing 211 with the pass-through holes 210 serves the purpose of the base ring 202, allowing the base ring 202 to be eliminated, simplifying the overall design. The arced plates 203 then lie directly adjacent to the housing 211 of the flow-guiding portion 102 and the rotating studs 204 pass directly into the pass through holes which serve the additional function originally provided by the pivot holes 208 in the base ring 202.

Returning to FIGS. 2A and 2B, according to one embodiment of the present invention, the flow guides 103 are formed from a venturi cone 212 that sits flush against the inner surface of the flow-guiding portion housing 211. The venturi cone 212 is tapered so that the diameter gets gradually smaller toward the exit opening of the venturi cone. The exit opening of the venturi cone 212 is the end closest to the concentric valve 101. The venturi cone is cut diagonally into segments to produce baffles or flow guides 103. The segmented venturi cone 212 is most visible in FIGS. 1, 2A, and 2B. When the concentric valve 101 is fully open, the flow guides 103 lie flush with the inner surface of the housing 211 of the flow-guiding portion 102. There need not be a flow guide 103 corresponding to every rotating stud 204. According to an embodiment of the present invention, the venturi cone 212 is cut into four segments, producing four flow guides 103. One of ordinary skill in the art would recognize that more or fewer flow guides 103 could be used without departing from the spirit and scope of the present invention.

According to an embodiment of the present invention, the venturi cone has a beveled or angled leading edge 105, which helps to prevent interference with air flow through the venturi cone and past the flow guides. The angled leading edge 105 and contour, and the length of the venturi cone, as measured from the entrance opening to the concentric valve may also vary in other embodiments and may extend longer than the inner diameter of the venturi cone.

Although the exemplary embodiment described herein has four flow guides, the number of flow guides may vary depending on the inside diameter of the concentric valve and/or the venturi cone. The shape of the flow guides need not be as shown in the figures, but may be a freestyle design from flow guide to flow guide in other embodiments. The thickness of the flow guides shown in the figures is for illustration purposes only and not intended to be limiting. Depending on the material used, the diameter of the rotating studs, and airflow requirements, the thickness may vary between embodiments and may not necessarily be uniform throughout a single flow guide. Flow guides may be positioned at various points along the venturi cone between the entrance and the concentric valve. For example, a first flow guide may extend from the entrance of the venturi cone to about ⅓ into the venturi cone, a second flow guide may begin at about ⅓ into the venturi cone and extend to about ⅔ into the venturi cone, and a third flow guide may be placed from about ⅔ to the end of the venturi cone directly in front of the concentric valve. Thus, the flow guides may be staggered at different positions and depths or distances along the venturi cone.

The rotating studs 204 pass through the pass-through holes 210 and attach to the flow guides 103. The end of the pass-through holes 210 inside the housing 211 is best illustrated in FIG. 2A. Attachment of the rotating studs 204 to the flow guides 103 can be done by a variety of means: the rotating studs may be integrally formed with the flow guides 103; or the flow guides 103 may have an extension that reaches through the pass-through hole 210 to connect with the rotating stud 204. According to one embodiment, an extension rod on each flow guide reaches back through the pass-through hole 210 in the flow-guiding portion housing 211 to connect with the rotating stud 204. The rotating stud 204 and extension rod may be attached to each other by insertion of one into a corresponding fitting of the other, welding, gluing, or any other means without departing from the spirit and scope of the present invention. According to one embodiment of the present invention, with a 90 degree rotation of the cam ring 201, the rotating studs 204 will rotate 45 degrees. This rotation is also imparted to the flow guides 103, and, as the concentric valve 101 closes, the flow guides 103 are rotated toward the center of the valve opening, progressively more aggressively directing air toward the center of the valve opening as it shrinks in size.

According to an embodiment of the present invention, each flow guide 103 has a stud receptacle 213 for receiving a rotating stud 204 from one of the arced plates 203. The rotating stud 204 inserts into the stud receptacle 213 creating a tight fit that does not slip when the rotating stud 204 is rotated. In this embodiment, where there are four flow guides 103, four of the arced plates 203 would have elongated rotating studs 204 which are long enough to fully insert into the stud receptacle 213. The rest of the arced plates 203 would have shortened rotating studs 204 which do not extend all the way into the interior of the housing 211.

Figure 4A:
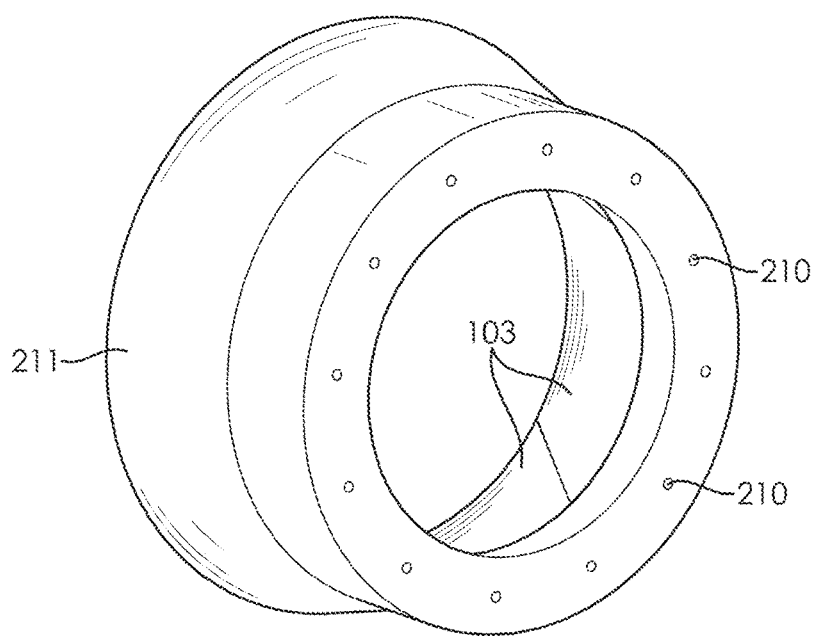
FIG. 4A is a perspective view of the flow-guiding portion without the concentric valve with the flow guides lying flush with the inner surface of the housing as they would when the concentric valve is in the fully open position according to an embodiment of the present invention.
Figure 4B:
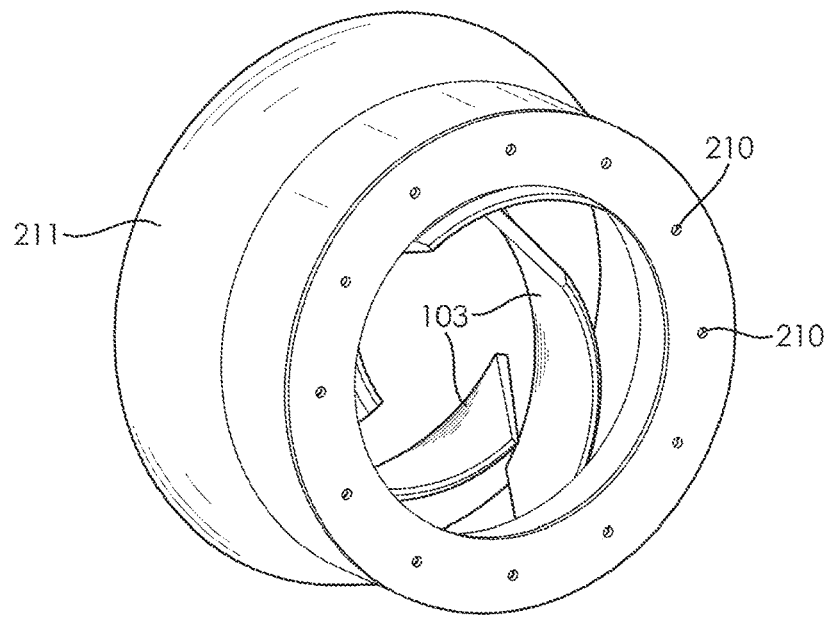
FIG. 4B is a perspective view of the flow-guiding portion without the concentric valve, with the flow guides slightly opened to direct air toward the center of the housing as they would be when the concentric valve is in a partially closed position according to an embodiment of the present invention.

FIGS. 4A and 4B show a perspective view of the flow-guiding portion without showing the concentric valve 101. These figures help to illustrate how the flow guides 103 change position with the opening and closing of the concentric valve 101. FIG. 4A shows the flow guides 103 lying flat against the inner surface of the housing 211. This is the position the flow guides take when the concentric valve 101 is fully open. FIG. 4B shows the same perspective view with the flow guides deployed or opened to direct air toward the center of the concentric valve 101 opening. This illustrates the position the flow guides 103 take when the concentric valve 101 is partially closed.

Figure 5:
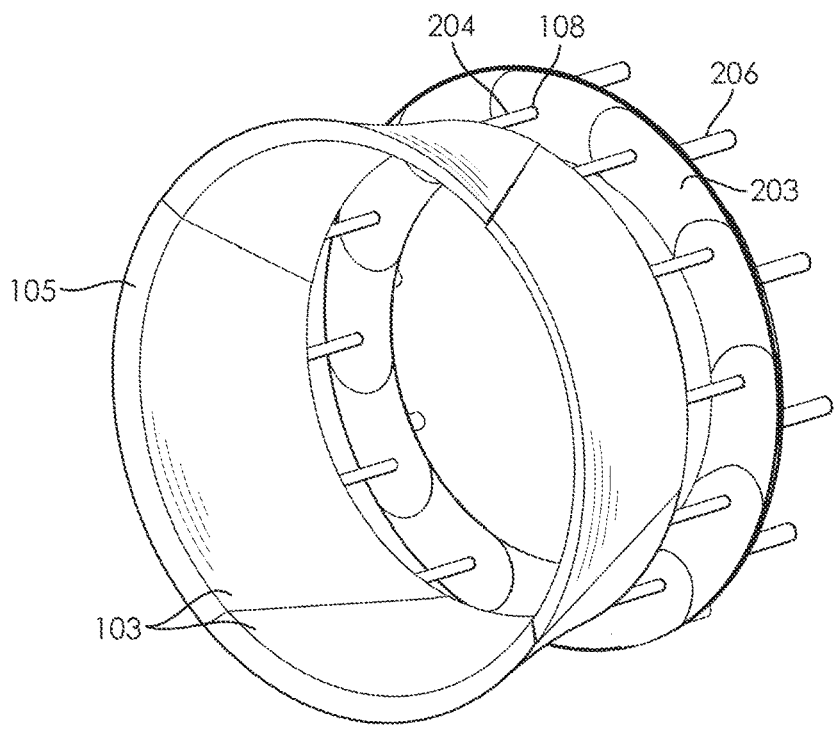
FIG. 5 is a diagram showing only four arced plates and the venturi cone segmented into four flow guides, without showing the flow-guiding portion housing or the remainder of the concentric valve assembly to illustrate the mechanical connection between the arced plates and the flow guides according to an embodiment of the present invention.

According to an embodiment of the present invention, FIG. 5 illustrates how the arced plates 203 connect to the flow guides 103 without showing the housing 211, cam ring 201, or base ring 202. The rotating stud 204 is rigidly connected to the flow guide 103 so that they do not rotate relative to each other. When the sliding stud 206 is moved and the arced plate 203 pivots at the rotating stud 204, the connected flow guide moves with it, pivoting at the rotating stud 204 at one end and moving the free end of the flow guide toward the center of the flow guide housing 211.

The number of rotating studs required depends on the number of flow guides used. Whatever rotating studs are not connected to a flow guide may be shortened or otherwise modified so they do not interfere with the flow guides. The material used for the rotating studs may be a resilient material such as metal, plastic, fiberglass, synthetic fiber, para-aramid synthetic fiber, carbon fiber, cellulose nanocrystals, resin or any combination of these materials. The thickness required of the rotating studs depends upon the material used, the size of the flow guides, and the stress on the flow guides due to air flow. Lubrication may also be required on the rotating studs. The rotating studs may be round, square, triangular, splined, or any shape necessary to connect to and engage with the baffles, or to transport lubrication material. The lubrication system may comprise a sealed oil feed maze system for the rotating studs and other friction points in the iris and flow guide mechanisms.

Figure 6A:
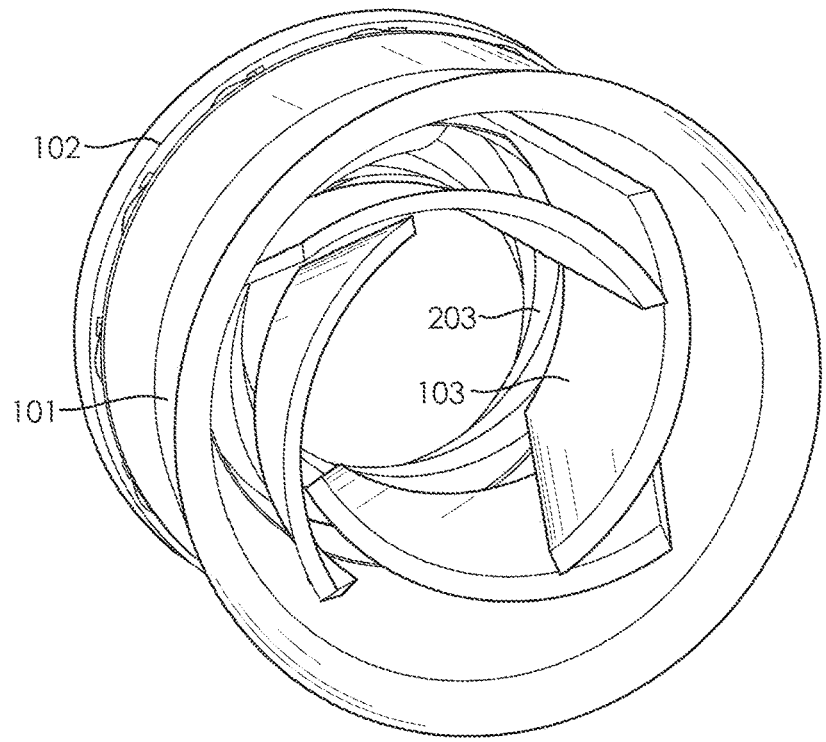
FIG. 6A is a front perspective view of the flow-guiding concentric valve with the valve partially closed, and flow guides partially rotated toward the central axis of the valve according to an embodiment of the present invention.
Figure 6B:
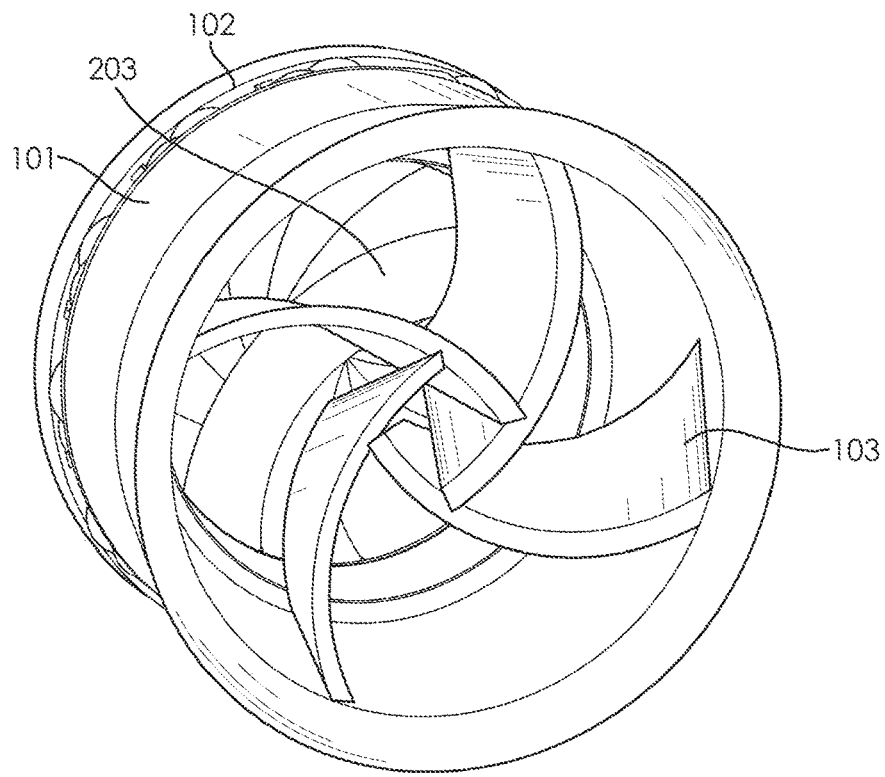
FIG. 6B is a front perspective view of the flow-guiding concentric valve with the valve fully closed, and flow guides fully rotated toward the central axis of the valve according to an embodiment of the present invention.

According to an embodiment of the present invention, FIG. 6A and FIG. 6B show the flow-guiding concentric valve 100 from the entrance side, which is the side of the venturi cone cut into several segments to form flow guides 103. In FIG. 6A, the arced plates 203 are slightly rotated to partially close the concentric valve 102. This causes the flow guides 103 to rotate toward the central axis of the flow-guiding concentric valve 100. As the concentric valve 102 is progressively closed, the flow guides 103 move with the arced plates 203, rotating until the concentric valve 102 is completely closed, as shown in FIG. 6B.

According to an embodiment of the present invention, the flow-guiding concentric valve is integrated into the throttle body of an internal combustion engine. The concentric valve 101 replaces the function of the butterfly valve commonly used in throttle bodies, and the flow-guiding portion lies directly in front of the concentric valve in the air flow path. According to one embodiment of the present invention, the concentric valve 101 goes from fully closed to fully open with 90 degrees of rotation of the cam ring 201. In other embodiment, the rotation required to open and close the concentric valve 101 may be more or less. Although a standard butterfly valve opens and closes with 90 degrees of rotation, the axis of rotation is perpendicular to the axis of rotation for the concentric valve 101. Therefore an actuating system would preferably operate to rotate the rotating studs or slide the sliding studs in order to open and close the concentric valve 101. Although the mechanism of movement is inherently different for the concentric valve 101, an actuating system can be designed that responds to the standard range of inputs produced by a throttle cable, or drive-by-wire system.

The description of the iris mechanism herein is for illustration purposes only, and should not be interpreted as limiting. The arced plates of the iris mechanism need not be of identical thickness, size, or shape. The thickness of the arced plates may vary according to materials used and system requirements for strength under vacuum and pressure. The number of arced plates used may also vary. As more arced plates are used, the overall wall thickness required of the throttle body housing is reduced, the rotation required to close the concentric valve is reduced, and the smoothness and consistency of the opening is improved. The size and dimensions of the arced plates may also vary based on the diameter of the concentric valve, number of leaves used, material used, and intended flow requirements.

The arced plates of the iris mechanism may control the rotation of the flow guides at variable rates. For example, each flow guide may move at a different rate of rotation from the other flow guides. In addition, the concentric valve may have stops configured at the beginning and end rotation points to prevent over-rotation which could damage or cause excessive wear to parts.

According to an embodiment of the present invention, the flow-guiding concentric valve has a drive system to actuate the rotating studs, or sliding studs of the concentric valve, and a spring mechanism to automatically return the concentric valve to a default closed position. Flow guides may be on an independent drive system, such as a separate cam ring about its housing and interfacing at each flow guide's pivot points.

Although the invention is described herein with the concentric valve 101 and the flow-guiding portion 102 connected together and working in unison, it should also be recognized that either the concentric valve 101, or the flow-guiding portion 102 may be used separately within a flow control valve design. When the concentric valve 101 is used separately from the flow guides, the rotating studs 204 need not extend through to the inside of the housing. When the flow-guiding portion 102 is used separately from the concentric valve 101, the rotating studs are connected to the flow guides 103 and a cam ring is configured to rotate the rotating studs 204.

While the invention has been shown and described with reference to specific preferred embodiments, it should be understood by those skilled in the art that various changes in form and detail may be made therein without departing from the spirit and scope of the invention as defined by the following claims.

The invention claimed is:

1. A flow-guiding, concentric valve for controlling volume and flow characteristics of a fluid in a predictable manner, the valve comprising:
   a funnel-shaped flow-guiding portion with a wider opening and a narrower exit, said flow-guiding portion comprising a cylindrical wall with a plurality of flow-guides recessed therein, wherein said flow-guides are configured to lift away from the cylindrical wall, overlap, and converge towards a central axis upon being deployed, thereby creating a vortex effect inside the valve;

a concentric valve portion comprising an iris mechanism for opening or closing the valve and deploying the flow-guides, wherein the concentric valve portion is attached to the exit of the funnel shaped flow-guiding portion, wherein the iris mechanism comprises:
- a base ring, and
- a rotatable cam ring;
- a plurality of arced plates having a front face and a back face, wherein each arced plate has a rotating stud protruding from the front face at one end thereof, and a sliding stud protruding from a back face at an opposite end thereof,
- wherein the rotating studs extend into corresponding pivot holes in the base ring, and the sliding studs extend into corresponding radial slits in the rotatable cam ring,
- wherein the arced plates are sandwiched between the base ring and the cam ring and in the fully open position the arced plates are aligned with the base ring and cam ring so they do not obstruct a valve opening defined by inner radii of the cam ring and base ring,
- wherein rotation of the cam ring moves the sliding stud on each arced plate in an arc across one side of the valve opening, causing the arced plates to pivot on the rotating stud and swivel toward the center of the valve opening, thereby obstructing the valve opening,
- wherein one or more of the rotating studs connects to one or more corresponding flow-guides such that, when the iris mechanism is closing, the rotating studs transfer movement of the arced plates to the flow-guides, increasingly turning the flow-guides toward the center of the iris mechanism as the iris mechanism closes.

2. The valve of claim 1 wherein the arced plates are made of a thin resilient material selected from the group comprising metal, plastic, fiberglass, synthetic fiber, para-aramid synthetic fiber, carbon fiber, cellulose nanocrystals, resin or any combination of these materials.

3. The valve of claim 1 wherein the arced plates are shaped in a semicircle.

4. The valve of claim 1 wherein the base ring is a flat annular plate with a number of pivot holes that pass through it.

5. The valve of claim 1 wherein the arced plates are oriented about an inner circumference of the concentric valve portion.

6. The valve of claim 1 wherein the base ring abuts the exit of the flow-guiding portion.

7. The valve of claim 1 wherein the rotating studs are rigidly connected to the flow-guides so that they do not rotate relative to each other.

8. The valve of claim 1, wherein the flow-guides move in concert with the arced plates so that as the valve opening gets smaller, the flow-guides converge causing more aggressive air flow towards the central axis of the valve.

9. An iris mechanism coupled to a valve housing having an opening and an exit, the iris mechanism comprising:
- a plurality of arced plates, and a rotatable cam ring with a plurality of radial slits,
- wherein each arced plate has a rotating stud on a bottom surface that passes into one of a plurality of pass-through holes in the housing and a sliding stud on a top surface that protrudes into one of the radial slits;
- wherein one or more of the rotating studs extends and connects to one or more corresponding flow-guides such that, when the iris mechanism is closing due to rotation of the cam ring causing the sliding stud on each arced plate to move in an arc across one side of the valve opening, the rotating studs transfer the movement of the arced plates to the flow-guides, increasingly turning the flow-guides toward a center of the iris mechanism as the iris mechanism closes.

* * * * *